…

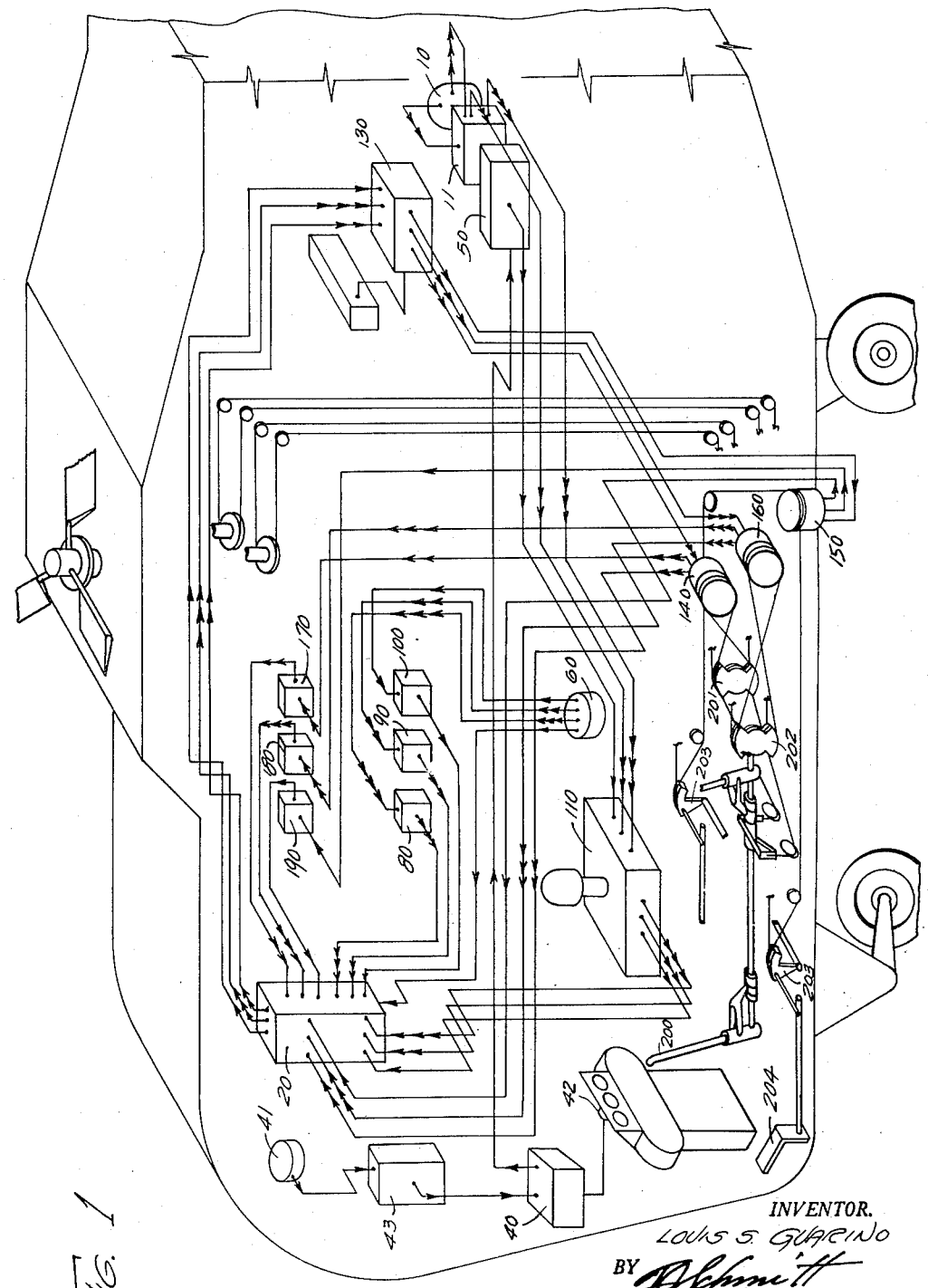

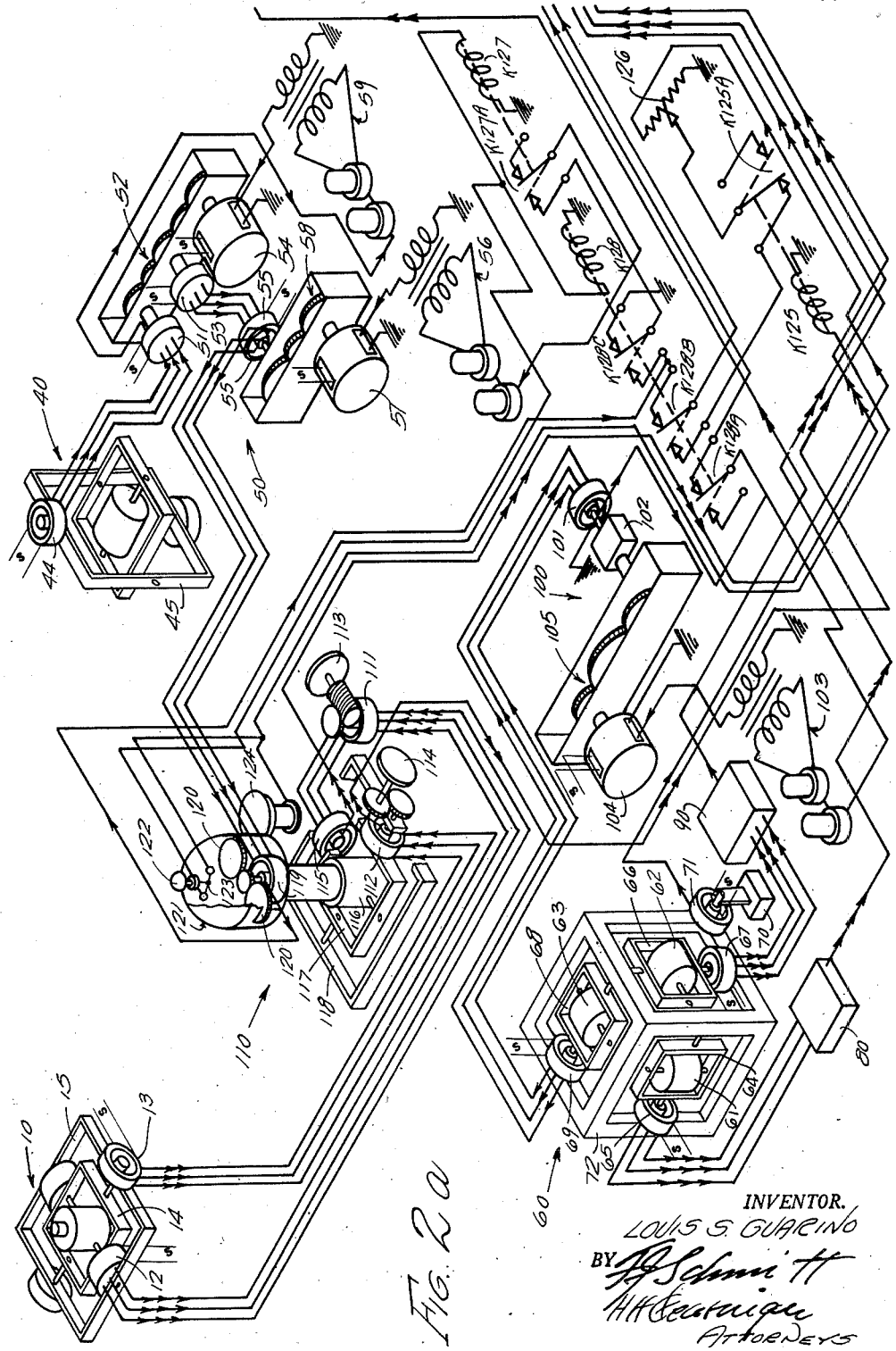

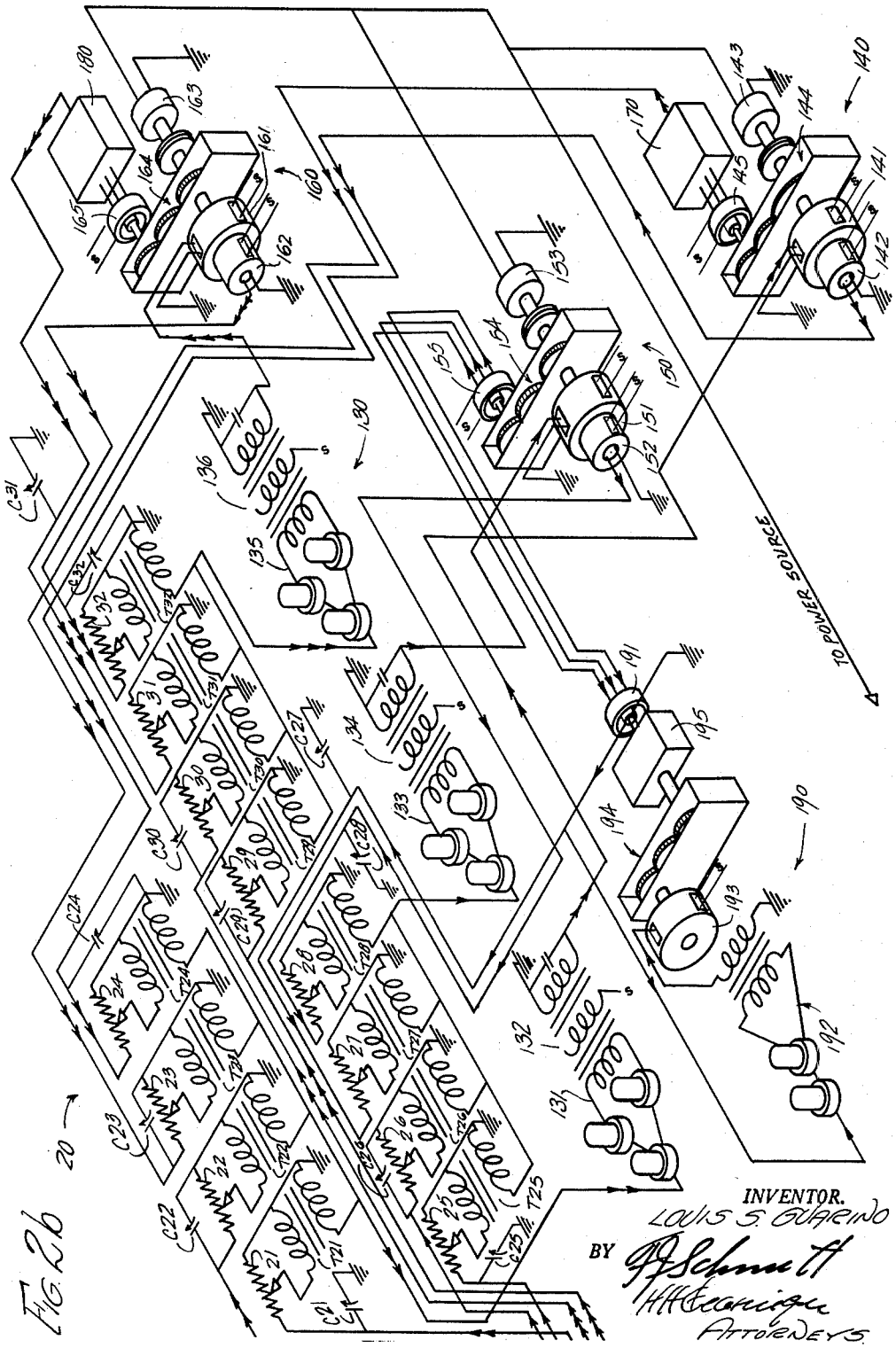

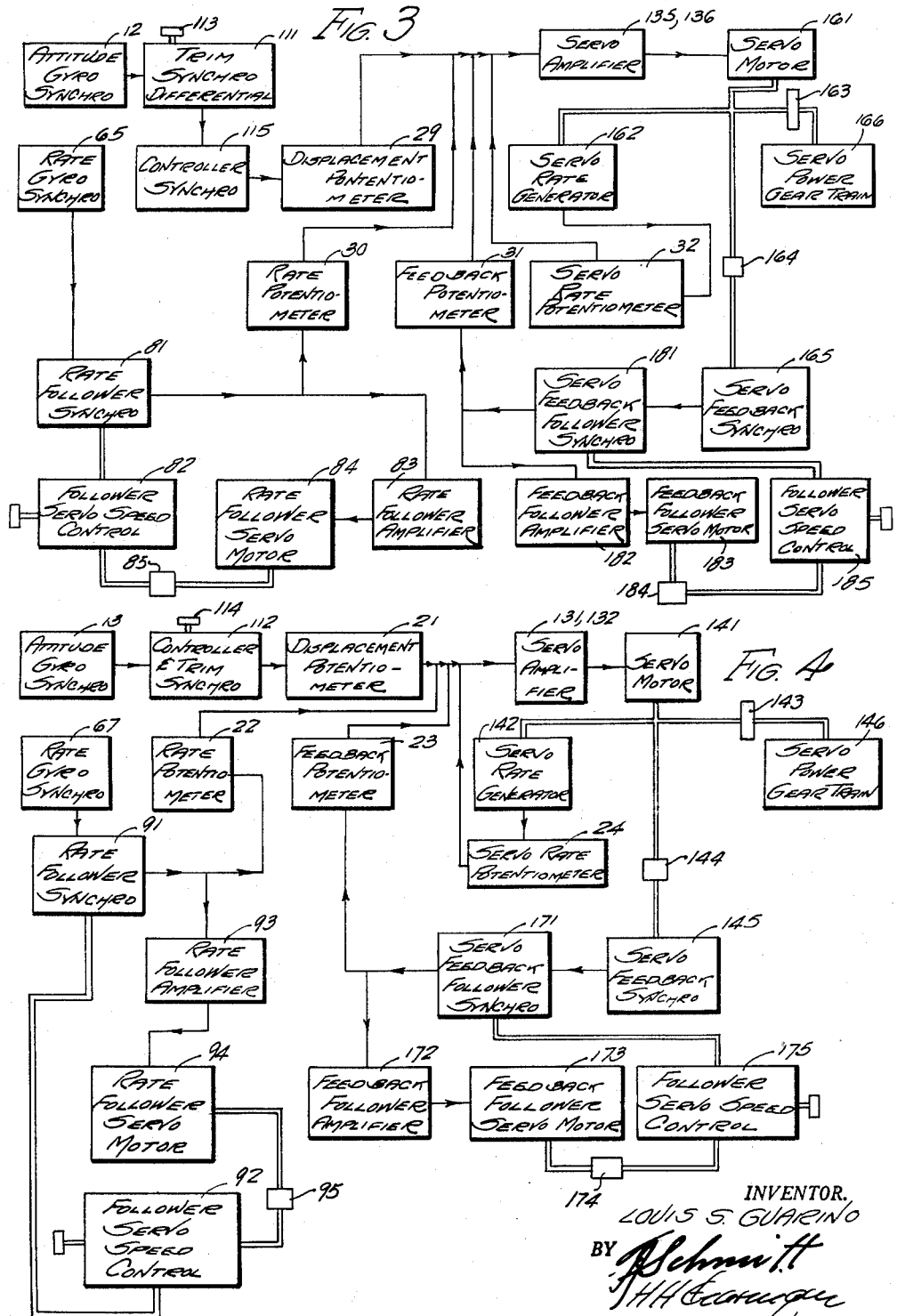

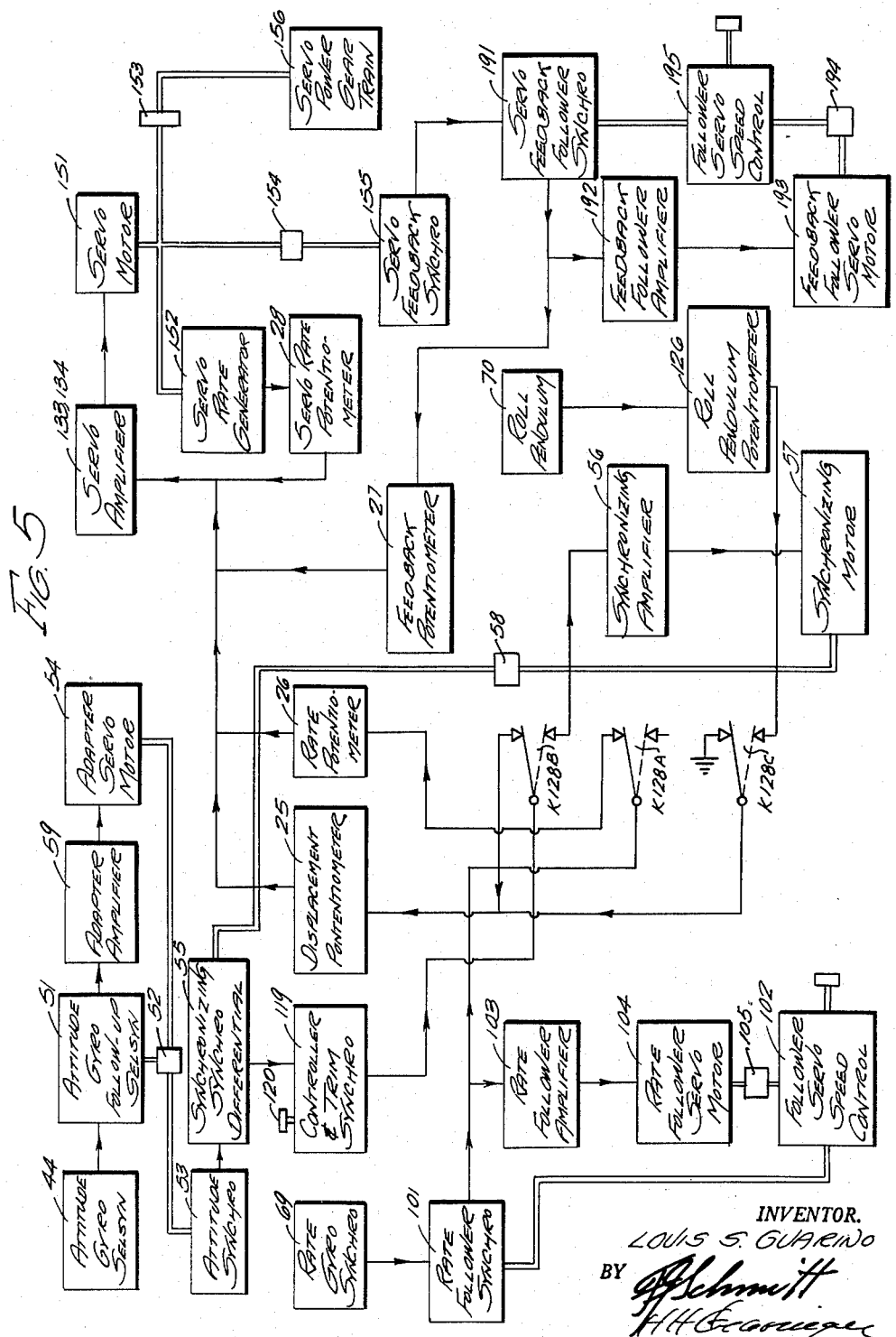

United States Patent Office 2,947,498
Patented Aug. 2, 1960

2,947,498
AUTOMATIC PILOT FOR ROTARY WING AIRCRAFT

Louis S. Guarino, 1128 Duncan Ave., Yeadon, Pa.

Filed June 12, 1953, Ser. No. 361,446

13 Claims. (Cl. 244—17.13)

(Granted under Title 35, U.S. Code (1952), sec. 266)

The invention described herein may be manufactured and used by or for the Government of the United States of America for governmental purposes without the payment of any royalties thereon or therefor.

This invention relates to the art of aircraft controls, dealing especially with control of rotating wing aircraft and is specifically directed to an all electric, three axis automatic pilot which provides effective control either separately of or correlated with the pitch, roll and yaw axes of a helicopter.

Automatic control of rotating wing aircraft presents many unusual problems due to the unique characteristics of such craft in flight. First, there is the problem of inherent instability of helicopters and other rotating wing craft in forward flight at relatively high speeds and especially in hovering. In hovering attitude the craft acts like a pendulum and has very little damping characteristics so that a slight unbalance condition can cause oscillation which if unchecked will reach disastrous proportions.

Second, there is a definite lag between the application of control forces and the reaction of the craft to the control. In a helicopter, for example, fuselage pitch, roll, direction of flight and speed are functions of main rotor tip path plane, the tip path plane itself is dependent upon swash plate attitude and the swash plate is controlled by the pilot from within the plane. Since tip path plane orientation is determined by dynamic factors in addition to swash plate attitude, there is a delay between the application of control forces to the swash plate and the response of the rotor plane to the new swash plate attitude. Likewise, there occurs another delay between the time the rotor plane reaches its new position and the time when the change in rotor plane begins to affect fuselage attitude. There is a somewhat less discrepancy between the application of corrective yaw control on the anti-torque tail rotor and its effect on the fuselage.

The significance of control delay is twofold. For one thing, it introduces the risk of overcontrol and for another it necessitates the application of corrective control before the craft reaches the attitude originally sought.

Upon further consideration of the rate of response to control and the effect upon the controlling quantities themselves of fuselage attitude changes brought about by control vectors, two additional factors are introduced to the complex problem of automatic control for rotary wing aircraft. These are the third and fourth factors noted below involved in devising a suitable automatic pilot.

Third, unlike conventional aircraft, the rate of response of rotating wing craft does not depend upon rate of application of control but upon the magnitude of the controlling force once it begins to take effect. This must be accounted for in the automatic pilot design.

Fourth, changes in fuselage attitude, since the rotors are carried on the fuselage, will affect the control forces applied to the fuselage through the rotors thus further complicating the overall picture. Putting all these factors together, the cause and effect of helicopter instability can be described as occurring in a cycle which exists in more than one plane, or it can be said to be a "spherical" cycle.

The present invention was developed with these characteristics of rotating wing aircraft in mind and a novel system has been developed including several unique components to effectively contend with the particular tendencies of rotating wing aircraft. Among the new components are a maneuvering controller, a yaw adapter and synchronizer, a rate follower, a follow-up follower, and a parameter control, all of which are hereinafter more fully described.

One of the primary objectives of this invention is the provision of an automatic pilot which will stabilize a rotating wing aircraft in a given condition of flight including takeoff, hovering, forward or lateral flight and coordinated turns.

Another important purpose of the invention is the development of an automatic pilot which will control a rotating wing aircraft in executing normal maneuvers of flight.

It is an object of this invention to provide means for automatically controlling a rotating wing aircraft about its roll, pitch and yaw axes.

It is an object of the invention to provide automatic pilot controls which function in parallel with the pilot's manual controls.

It is also an object of this invention to create an automatic pilot so constructed that it may be applied at any time without the necessity of trimming controls.

This invention also has for an object the use of automatic pilot servo-mechanisms which utilize electrical input signals derived with reference to fuselage attitude.

A further object lies in the use of gyroscopes which sense angular displacement and rate of angular change and transform these quantities to electrical signals.

Another object of this invention is to provide parameter controls in an automatic pilot to compute an error signal to be utilized in a servo-mechanism.

It is another object of this invention to develop parameter controls which compare gyroscope rate and displacement signals with position feedback and servo rate signals to determine servo input signal.

The use of a rate follower which automatically adjusts the rate parameter to select the degree of phase lead necessary to provide adequate damping is another object of this invention.

It is still another object of this invention to provide a follow-up follower to cancel position feedback residual error and reestablish a reference.

This invention also has for an object the design of a novel follower component which can be employed to function either as a rate follower or as a follow-up follower in an automatic pilot.

The provision of a novel controller for maneuvering through the automatic pilot is another object of this invention.

It is another object of the invention to teach the construction of an automatic pilot controller distinguished by a unique arrangement of the yaw trim controls.

It is also an object of this invention to provide in the controller a manually operated coordinated turn switch for shifting yaw control from gyroscope to pendulum.

Other objects and many of the attendant advantages of this invention will be readily appreciated as the same becomes better understood by reference to the following detailed description when considered in connection with the accompanying drawings wherein:

Figure 1 is a schematic representation of the automatic pilot system showing in general the orientation of the components;

Figures 2a and 2b compose Figure 2 which is a more detailed electromechanical schematic diagram of the system illustrating the electrical interconnections between the various electrical and electro-mechanical parts of the automatic pilot when it is in engaged condition and;

Figures 3, 4 and 5 are loop block diagrams of the pitch, roll and yaw channels respectively of the automatic pilot.

GENERAL ORIENTATION OF COMPONENTS

The system is generally an all electric, three axis, self-synchronous stabilizer and automatic controller which controls yaw, pitch and roll axes of the fuselage of a rotary wing aircraft. Figure 1 shows the various components of the system in their physical relation to each other and to a helicopter fuselage and shows the signal flow between units.

The automatic pilot includes gyroscopic devices which sense angular changes and rate of change in fuselage attitude and translate those quantities into electrical signals which are discriminated and amplified for input to servo-mechanisms which operate on the aircraft controls.

Roll and pitch displacement signals originate in a vertical gyro 10 which contains an erection mechanism detector and includes an erection amplifier 11. Amplified roll and pitch displacement signals are conducted through components of the maneuvering controller 110 to a parameter control unit 20. Here roll and pitch displacement signals are mixed with, properly phased with and proportioned to roll and pitch rate signals which have their source in a rate and pendulum unit 60 and which reach the parameter control through rate followers 90 and 80 respectively.

Yaw displacement signals are supplied from a compass controlled directional gyroscope 40 which is part of a master direction indicator 42 operated in conjunction with a compass transmitter 41 and compass amplifier 43. A selsyn pickoff signal from the directional gyroscope is fed to a yaw adapter and synchronizer 50 which provides a synchro signal which passes through the maneuvering controller 110 to the parameter control unit 20.

Yaw rate signals are developed in the rate and pendulum unit 60 and mixed with yaw displacement signals at the parameter control unit 20 after passing through a yaw rate follower 100. On coordinated turns roll pendulum signals replace yaw rate and displacement signal as inputs to the parameter control and yaw displacement signals are fed to the yaw adapter and synchronizer which acts to keep the yaw displacement signal at null.

The mixed rate and displacement signals corresponding to the roll, pitch and yaw channels are amplified in the respective channels of a servo amplifier 130 whose amplified output drives the roll, pitch and yaw servo-mechanisms 140, 160 and 150, respectively, to operate control quadrants 201, 202 and 203. The servo-mechanisms are in parallel with the pilot's control stick 200 and the pilot's tail rotor control pedal 204.

As the servos begin to operate, position feedback signals and servo rate signals are generated for input to the parameter control unit 20. The respective position feedback signals pass through follow-up followers 170, 180, and 190 which modify the signal before it actually enters the parameter control unit.

In the parameter control unit 20 gyroscope displacement, gyroscope rate, position feedback and servo rate signals corresponding to each of the axes are mixed, phased and proportioned according to the characteristics of the aircraft and the signals actually fed to the servo amplifiers are the resultants of the four signals mixed together in the parameter control.

When the automatic pilot is disengaged, roll and pitch displacement signals travel through the system to operate the servo mechanisms in the same manner as when the auto-pilot is engaged. However, clutches connecting servo output to the aircraft controls are disengaged so that control of the aircraft is through the manual control stick 200 and tail rotor control pedal 204. Yaw displacement signals are cancelled by null seeking mechanisms in the yaw adapter and synchronizer 50 and yaw rate and roll pendulum signals are opencircuited. In this manner the system remains in synchronism with the aircraft during changes of attitude that take place while the automatic pilot is disengaged and the system can be engaged at any time without the necessity of trimming.

DETAILS OF THE SYSTEM

The nature of the components of the system and their functions will now be more fully explained with reference to Figure 2 and the block diagrams of Figures 3, 4 and 5.

Before attempting to explain the entire system, the structure and function of each of the novel units will be described.

The maneuvering controller

The maneuvering controller 110 contains the controls for maneuvering the aircraft through the automatic pilot. It includes the automatic pilot engage switch 124 which closes the power circuit for the servo-motor clutches, for the relay K125 and to the coordinated turn switch 123 which is also part of the controller. The controller also includes a roll trim synchro 112, a pitch trim synchro 115 and yaw trim synchro 119. The synchros 112 and 115 are mounted on gimbal rings 118 and 117 respectively whose center is the control stick 116 and control knob 121. The yaw trim synchro 119 is mounted on the control stick within the knob 121. The stick is of the displacement type with a detent provided for the center position. Movement of the control stick about its axis parallel to the pitch axis will turn the rotor of the pitch trim synchro relative to its stator introducing an error signal which subsequently finds its way to the pitch servo and likewise movement of the control stick about its axis parallel to the roll axis will turn the rotor of the roll trim synchro relative to its stator generating a signal which will actuate the roll servo. Steady state trim changes in roll are compensated through a mechanical differential movement of a gear train positioned by manipulation of the roll trim control knob 114 which thereby produces rotation of the roll trim synchro rotor while trim changes in pitch are compensated by controlling the rotor of the differential synchro 111 through pitch trim control knob 113. The differential synchro 111 connected in series between the pitch trim displacement synchro of the vertical gyroscope and the pitch trim synchro 115 is thus employed as an alternative to the use of a mechanical differential of the type used in the roll portion of the system, because the nature of movement about the pitch axis is such that the differential synchro is more suitable in this application than a mechanical differential. Yaw trim and maneuvering is accomplished by rotating the rotor of the yaw trim synchro 119 by means of a set of gears which terminate in knurled wheels 120 that project through suitable slots in the knob 121. The coordinated turn switch 123 is a normally closed switch operated by switch button 122. In its normally closed position this switch closes a circuit energizing the relays K127 and K128, bringing the relay contacts K127A, K128A, K128B and K128C into the solid line positions shown in Figure 2 so that yaw rate and displacement signals are fed to the parameter control. When the switch button is depressed during coordinated turns control authority for the yaw channel is shifted to the roll pendulum 70.

Yaw adapter and synchronizer

The yaw adapter and synchronizer 50 is also a novel component developed for the instant invention. This unit comprises two related servo-mechanism enclosed in one housing, an adapter and a synchronizer. Let us first consider the adapter portion which includes an attitude gyroscope follow-up selsyn 51 connected through a gear train 52 to a yaw attitude or displacement synchro 53 and an adapter servo-motor 54 driven from the output of a yaw adapter amplifier 59. Yaw displacement signals from the attitude gyroscope selsyn 44 are received in the stator of the follow-up selsyn 51 and the resulting rotor signal is fed to the adapter amplifier 59 which amplifies the signal to provide driving power to the servo-motor 54. Rotation of the servo-motor is carried through the gear train 52 to position the rotor of the yaw displacement or attitude synchro 53 and to return the rotor of the follow-up selsyn to a null position. The proportional signal produced in the yaw displacement synchro stator is transmitted to the yaw synchronizer which will now be more fully described.

The yaw synchronizer comprises a yaw synchronizing synchro 55, a yaw synchronizing amplifier 56, synchronizer servo-motor 57 and a gear train 58. The yaw synchronizing synchro is a differential type synchro whose stator is connected to the output of the yaw displacement synchro 53 of the synchronizer and whose rotor is positioned by the synchronizer servo-motor 57 through the gear train 58. With the automatic pilot engaged and the coordinated turn switch in its normally closed position, the input to the amplifier 56 is grounded and there is no input to the synchronizer servo-motor so that the yaw displacement signal passes through the differential synchro 55 to the yaw trim synchro 119 in the maneuvering controller and then to the yaw parameter control. When a coordinated turn is ordered by depressing the button 122 or when the automatic pilot is disengaged the output of the yaw trim synchro is fed to the synchronizer amplifier which drives the servo-motor 57 to position the rotor of the differential synchro 53 at null.

It may be noted that if a directional gyroscope is used which is capable of providing a synchro signal to the yaw synchronizer the adapter portion of the yaw adapter and synchronizer may be dispensed with.

*Rate followers and follow-up followers*

The rate followers and follow-up followers are substantially identical components which are named according to their use in the system. If the unit is used as an automatic rate parameter adjuster it is termed a rate follower and if its purpose is to cancel position feedback residual error it is called a follow-up follower. A schematic representation of the major components of the yaw rate follower 100 is shown in Figure 2. The roll rate follower 90 and pitch rate follower 80 appear only as blocks, because the rate followers for each channel are identical in construction and operation. Each of these followers is arranged to generate a derived acceleration signal characterized by an adjustable phase lead which is effective through the parameter control unit to modify movement of the corresponding control servo so that it anticipates and compensates for the lagging displacement of the fuselage in response to movement of the controls which typifies helicopter operation.

For example, the output of a yaw rate synchro 69 in the rate and pendulum unit 60 is conducted to the stator of a yaw rate follower synchro transformer 101 and the resulting rotor signal is fed to a yaw rate follower amplifier 103 and to the yaw parameter control. The amplified output of the amplifier 103 drives servo-motor 104 to rotate the rotor of the rate follower synchro 101 toward null through a gear train 105 and a variable speed drive unit or servo speed control 102. The variable speed drive unit is set so that the modified rate signal appearing at the parameter control bears the desired degree of phase lead with respect to the gyroscope rate signal to impart adequate damping to the helicopter through the automatic pilot. In other words, this unit predicts and provides correction for the expected helicopter attitude change as indicated from the rate signal and considering the control response lag of the helicopter. The rate follower can be made automatically adjustable by tieing the speed control unit to change in gyroscope rate by means of a servo-mechanism.

When used as a follow-up follower the unit again is essentially a null seeking servo-mechanism whose speed of seeking null is adjustable either automatically or manually. Manual speed controls are shown but may be made automatic by utilizing a servo-mechanism controlled by changes in rate signals. A follower unit employed as a follow-up follower is shown in the yaw channel at 190 and appears as a block 180 and 170 respectively in the pitch and roll channels. An explanation of the yaw follow-up follower will suffice to show the nature of the follow-up follower in each channel since they are identical. It is seen that the follow-up follower 190 comprises a synchro transformer 191, a follow-up follower amplifier 192, a servo-motor 193, gear train 194 and variable speed drive unit 195. Signals indicating servo shaft position from a sensor on the yaw control servo reach the stator of the follow-up follower synchro transformer 191 and the induced rotor signal is fed to the yaw follow-up follower amplifier as well as to the parameter control. The rotor of the synchro 191 is driven toward null through the gear train and variable speed drive unit by the servo-motor 193 which receives the output of amplifier 192. Thus the follow-up follower feeds back to the parameter control a signal which reflects the predicted control effect of the control servo output effectively making the automatic pilot a closed loop system on a short term basis and continuously cancels feedback residual error to reestablish the reference at the yaw feedback synchro 155.

Rate follower and follow-up follower components for the roll and pitch axes are seen in the block diagrams of Figures 3 and 4.

In the roll channel, rate follower components include a rate follower synchro 91, rate follower amplifier 93, rate follower servo-motor 94, gear train 95 and follower servo speed control 92, while the roll follow-up follower comprises a servo feedback follower synchro 171, a feedback follower amplifier 172, feedback follower servo-motor 173, gear train 174 and follower servo speed control unit 175.

In the pitch channel a rate follower synchro 81, rate follower amplifier 83, rate follower servo-motor 84, gear train 85 and follower servo speed control 82 make up the rate follower and a servo feedback follower synchro 181, a feedback follower amplifier 182, a feedback follower servo-motor 183, a gear train 184 and a follower servo speed control 185 compose the follow-up follower.

*Parameter control unit*

The parameter control unit 20 contains gradient potentiometers, mixing transformers and phasing capacitors for all signal inputs to the automatic pilot. It is divisible into three sections, a roll parameter control, a pitch parameter control and a yaw parameter control. In this unit gyroscope displacement signals for roll, pitch and yaw are received on the gradient potentiometers 21, 29 and 25 respectively. Gyroscope rate signals for the roll channel are fed into the potentiometer 22, for the pitch channel into the potentiometer 30, and for the yaw channel into the potentiometer 26. Potentiometers 23, 31 and 27, respectively, have impressed on them the position feedback signals from the control servos in the roll, pitch and yaw channels while control servo rate signals enter the parameter controls at the gradient potentiometers 24, 32 and 28. The gyroscope displacement, gyroscope rate, servo position feedback and servo rate signals for the roll channel are mixed, phased and proportioned in the roll parameter control and the resulting signal is used to control the control servo for that channel. Capacitors C21, C22, C23, C24, C25, C26, C27, C28, C29, C30, C31 and C32 are the phasing capacitors for each of the input signals to the parameter control. The mixing transformers are designated T21, T22, T23, T24, T25, T26, T27, T28, T29, T30, T31 and T32. Similarly the signals for the pitch and yaw channels are mixed in the pitch parameter control and in the yaw parameter control to obtain a resultant which has been modified by the addition of closed loop factors, thus accounting to the desired degree for the inherent control lags in a rotating wing aircraft.

The arrangement of elements within the parameter control unit 20 as illustrated in Fig. 2b is an essential factor in successful operation of this device. Since the control servo assemblies 140, 150, and 160 connected to the parameter control unit 20 require inputs of substantially constant impedance, the mixing transformers are coupled together as shown in Fig. 2b so that the respective output signals from the three sections of the parameter control unit each has substantially constant impedance. Meanwhile, the various potentiometers on the input side of the parameter control unit may be adjusted according to the inherent operating and control characteristics of the particular helicopter in which this equipment is installed without substantially altering the impedance of the output signals emanating from the parameter control unit.

In addition to the novel components described in detail above, the other components included in this system are described below to facilitate a complete understanding of this device.

Roll and pitch displacement signal circuits

Roll and pitch displacement signals have their origin in a vertical gyroscope 10 of conventional design. Synchro type detectors mounted in the gyroscope case provide electrical signals proportional to the angle between the gyroscope spin axis and the case of the instrument. A pitch displacement synchro 12 mounted on a gimbal ring 14 provides the pitch signal while a roll displacement synchro 13 carried on a gimbal ring 15 generates the roll signal.

Signal voltages from the vertical gyroscope are conducted to trim synchros located in the novel maneuvering controller 110 which contains the controls for maneuvering the aircraft through the automatic pilot.

Trim correction for steady state trim changes can be made by manipulating the trim control knobs 113 and 114. An output signal is taken from the rotors of the respective roll and pitch synchros 112 and 115 and led to the gradient potentiometers 21 and 29 of the parameter control unit where it is mixed, phased and proportioned with respect to gyroscope rate, position feed-back and control servo rate signals and becomes the input signal to the appropriate servo amplifier.

Yaw displacement circuits

Yaw displacement signals are generated by a yaw displacement selsyn 44 mounted on a gimbal ring 45 in a directional gyroscope 40. Output of the selsyn 44 is fed to a selsyn follow-up 51 in the yaw adapter and synchronizer unit and operated upon by the adapter portion of said unit as set forth above to produce a yaw displacement synchro signal for input to the yaw trim synchro 119 through the synchro differential 55. Trim correction may be introduced at this point by operation of the yaw trim control wheels 120. The rotor signal of the yaw trim signal is conducted to a coordinated turn control located in the servo amplifier. The coordinated turn control includes three relays, K125, K127 and K128 which operate the relay contacts K125A, K127A, K128A, K128B and K128C. With the automatic pilot engage switch 124 closed and the coordinated turn switch in its normally closed position, all the relays are energized and the relay contacts are in the positions shown in solid lines in Figure 2. Under these conditions, the yaw signal goes to the gradient potentiometer 25 in the yaw parameter control where it is mixed with the other input signals for input to the servo amplifier.

On coordinated turns, the switch 123 is opened, de-energizing the relays K127 and K128 and causing the contacts of those relays to take the positions shown in dotted lines in Figure 2. The yaw displacement signal is conducted through relay contacts K128C and K127A to the input of the yaw synchronizing amplifier 56 where it is amplified and utilized to keep the yaw displacement synchro at null. Yaw rate signals are open circuited at relay contact K128A and the rate and displacement inputs in yaw are replaced by a roll pendulum signal produced in the synchro 71 by the action of a roll pendulum 70. This latter signal is proportioned at the roll pendulum potentiometer 126 and enters the yaw parameter control at the potentiometer 25 through the relay contacts K125A.

Rate circuits

Rate input signals for all channels are provided from a rate and pendulum control unit 60 including a rigid frame member 72 fixedly mounted within the fuselage and arranged to support a pitch rate synchro 65 whose rotor position is controlled by a pitch rate gyroscope 61 carried by a gimbal ring 64, a roll rate synchro 67 with its rotor controlled by a roll rate gyroscope 62 mounted in the gimbal ring 66 and a yaw rate synchro 69 the rotor of which is positioned by a yaw rate gyroscope 63 mounted upon gimbal ring 68. The rate signals in pitch, roll and yaw are conducted to the rate followers 80, 90 and 100 respectively where said signals are modified as explained above in connection with the yaw rate follower 100. From the pitch rate follower 80 the signal enters the rate gradient potentiometer 30 in the parameter control unit while roll rate signals leaving the follower 90 enter the roll parameter control through gradient potentiometer 22. Yaw rate signals are led to a gradient potentiometer 26 in the yaw parameter control through the relay contact K128A but on coordinated turns or when the automatic pilot is disengaged the yaw rate signal is open circuited at K128A.

Servo-mechanisms and amplifiers

The servo-mechanisms for all channels, except for external connections are substantially identical. The servo-amplifiers for each channel are contained in the servo-amplifier unit 130.

At the first instant of automatic pilot operation there will be no position feedback or servo rate signals so the input to the servo-amplifier will consist of gyroscope rate and displacement signals mixed in their proper phase and proportion relationships. The roll signal goes through the three stage amplifier 131 and the magnetic amplifier 132 whose output drives the roll servo-motor 141 of the roll servo 140 in accordance with the error signal output of the parameter control. Similarly, the three stage amplifier 135 and magnetic amplifier 136 provide amplification for the pitch signal to drive the pitch servo-motor 161 included in the pitch servo 160 and a yaw servo-motor 151 in the yaw servo 150 receives power from a yaw servo-amplifier comprising a three stage amplifier 133 and magnetic amplifier 134. Obviously, the servo-amplifiers may consist of any number of stages and include any practical means of amplification or combination of said means.

The roll, pitch and yaw servos are connected to the proper helicopter control rigging by servo power gear trains 146, 166 and 156, so designated in the block diagrams, Figs. 4, 3, and 5, respectively, and by magnetic clutches 143, 163 and 153 respectively which are energized upon closing of the automatic pilot engage switch 124.

Upon rotation of the roll servo-motor, a roll servo rate generator 142 provides a rate signal which is fed into the rate potentiometer 24 and a roll feedback synchro 145 driven through gear train 144 develops a position feedback signal which also enters the parameter control through a potentiometer 23 after being operated on by a residual error canceler or roll follow-up follower 170. These last two mentioned signals are mixed with the gyroscope roll rate and roll displacement signals and together therewith form the roll error signal fed to the roll servo-amplifier. The pitch servo rate generator 162 provides a servo rate signal which reaches the pitch parameter control at the control servo rate signal potentiometer 32 and a position feedback synchro 165 which is driven by the pitch servo-motor through a gear train 164 generates a position feedback signal for input to the pitch parameter control at the pitch position feedback potentiometer 31. The feedback signal passes through a pitch follow-up follower 180 where it is modified as described above in connection with the explanation of novel components. As in the roll channel, the pitch servo rate and position feed-back signals entering the parameter control are mixed, phased and proportioned with the pitch gyroscope rate and displacement signals to produce a corrected signal for input to the servo-amplifier.

Comparable units in the yaw channel are rate generator 152, gear train 154 and yaw feedback synchro 155. The feedback signal, after being modified in the yaw follow-up follower 190 is fed to the yaw parameter control along with a yaw servo rate signal, these signals entering at the potentiometers 31 and 32 respectively for mixing with the gyroscope rate and displacement signals.

With the helicopter controls set in any given position and the automatic pilot engaged, deviation of the helicopter fuselage from the attitude selected by the controls will generate rate and displacement gyroscope signals which are conducted through their respective channels to cause corrective control to be applied to bring the fuselage back to the desired attitude. On a long term basis error signals cease to be generated when the fuselage reaches the attitude set in the controls making the automatic pilot essentially an open loop system. On a short term basis, however, novel follower components continuously affect the error signal in accordance with the rate and amplitude of corrective control being applied so that the system also has the characteristics of a closed loop system. Because of the characteristic control lag of a helicopter or other rotary wing aircraft, the closed loop qualities are necessary to prevent against overcontrol and hunting which might otherwise occur and to reestablish the zero reference.

OPERATION OF THE AUTOMATIC PILOT

The details of the operation of the present invention can most readily be understood by consideration of the operation of the pitch, roll, and yaw portions of the system, taking note of the manner in which the operation of each of these portions differs from that of the others.

The portion of this system including the various pitch components is represented by the block diagram shown in Fig. 3 which indicates the sources and paths of transmission for the various signals relating to movement of the fuselage of a helicopter about its pitch axis. The signal generated by the attitude gyro synchro 12 and reflecting the position of the fuselage relative to the vertical gyro assembly 10, shown best in Fig. 2a, is transmitted through the trim synchro differential 111 to the controller synchro 115 located upon the inner gimbal of the manual controller assembly 110 as shown in Fig. 2a and thence to the displacement potentiometer 29 within the parameter control unit 20 shown best in Fig. 2b. The signal generated by the rate gyro synchro 65 mounted in the rate and pendulum unit 60 as shown in Fig. 2a is transmitted to the rate follower synchro 81 and thence to the rate follower servo motor 84 through the rate follower amplifier 83 and also to the rate potentiometer 30 within the parameter control unit 20. In addition, the rate follower servo motor 84 is mechanically coupled to the rate follower synchro 81 through the gear train 85 and thence through the adjustable follower servo speed control 82. Elements 81, 82, 83, 84 and 85 are arranged within the pitch rate follower 80 in the same manner as the corresponding elements of the yaw rate follower 100 shown schematically in Fig. 2a. The pitch servo motor 161 which operates in response to a signal transmitted thereto from the parameter control unit 20 through the servo amplifier 135, 136 is mechanically coupled to the servo rate generator 162 and through the servo feedback gear train 164 to the servo feedback synchro 165, and also through the magnetic clutch 163 to the servo power gear train 166. Movement of the servo rate generator 162 generates a signal which is transmitted to the servo rate potentiometer 32 within the parameter control unit 20. Likewise, movement of the servo feedback synchro 165 generates a signal which is transmitted to the servo feedback follower synchro 181 and thence to the feed-back potentiometer 31 in the parameter control unit 20. In addition, the servo feedback follower synchro 181 is mechanically coupled to the follower servo speed control 185 and thence through the gear train 184 to the feedback follower servo motor 183 which also receives the signal transmitted by the servo feedback follower synchro 181 through the feedback follower amplifier 182. Hence, due to the novel arrangement of the pitch section of the parameter control unit 20 in the manner shown in Fig. 2b, the signals received by the displacement potentiometer 29, the rate potentiometer 30, the feedback potentiometer 31, and the servo rate potentiometer 32 are mixed, phased and proportioned to take into account and allow for the critical performance characteristics of a helicopter before they are transmitted to the servo amplifier 135, 136 and thence to the pitch control servo 160 shown best in Fig. 2b.

The roll portion of the system represented by the block diagram shown in Fig. 4 operates in substantially the same manner as the pitch portion, since it contains components which correspond directly with those described in detail above in relation to the showing in Fig. 3, with one exception. It will be noted that the roll portion as shown in Fig. 4 omits a trim synchro differential corresponding to the trim synchro differential 111 connected in series between the attitude gyro synchro 12 and the controller synchro 115 as shown in Fig. 3. This modification is possible because trim about the roll axis may conveniently be provided by a manually controlled mechanical differential, not shown in Fig. 4, effective to displace the rotor of the synchro 112. Hence, this synchro is called the controller and trim synchro, in view of its dual functions. In the absence of any other distinguishing features in arrangement of the roll portion of the system, the operation of this portion will not be discussed any further here.

The yaw portion of the system is represented by the block diagram comprising Fig. 5 which indicates the sources and paths of transmission for the various signals relating to movement of the fuselage of a helicopter about its yaw axis. The signal generated by the attitude gyro selsyn 44 and reflecting the position of the fuselage relative to the directional gyro assembly 40, shown best in Fig. 2a, is transmitted to the attitude gyro follow-up selsyn 51 in the yaw adapter and synchronizer, shown best in Fig. 2a, and thence through the adapter amplifier 59 to the adapter servo motor 54. The attitude gyro follow-up selsyn 51 and the adapter servo motor 54 are also mechanically coupled through the gear train 52 to the attitude synchro 53 which generates a signal that is transmitted through the sychronizing synchro differential 55 to the controller and trim synchro 119, mounted upon the control stick 116 of the maneuvering controller 110 as shown in Fig. 2a and thence through the switch K128B to the displacement potentiometer 25 within the parameter control unit 20 shown in Fig. 2b. It should be noted at this point that energization of the system energizes the relay coil K128 shown in Fig. 2a which when energized places the switches K128A, K128B, and K128C in the solid line position as shown in Figs. 2a and 5. The rate gyro synchro 69 mounted in the rate and pendulum unit 60 as shown in Fig. 2a generates a signal which is transmitted through the rate follower synchro 101 of the yaw rate follower 100 shown in Fig. 2a and thence through switch K128A to the rate potentiometer 26 within the parameter control unit 20 and also from the rate follower synchro 101 to the rate follower amplifier 103 and thence to the rate follower servo motor 104. In addition, the rate follower sychro 101 is mechanically connected through the follower servo speed control 102 and gear train 105 to the rate follower servo motor 104. For coordinated turns, the switch button 122, shown in Fig. 2a, is depressed to open the switch 123 and thereby deenergize the relay coil K128 also shown in Fig. 2a so that the switches K128A, K128B, and K128C move to the dotted line positions shown in Figs. 2a and 5. Due to the movement of the switch K128B, the signal emanating from the controller and trim synchro 119 is transmitted to the synchronizing amplifier 56 instead of to the displacement potentiometer 25 in the parameter control unit 20 and thence to the synchronizing motor 57. Meanwhile, the signal generated by the roll pendulum 70 mounted upon the frame 72 of the rate and pendulum unit 60 in the manner indicated in Fig. 2a is transmitted through the roll pendulum potentiometer 126 and the switch K128C to the displacement potentiometer 25 within the parameter control unit 20. The simultaneous movement of the switch K128A opens the circuit between the rate follower synchro 101 and the rate potentiometer 26. The remainder of the yaw portion of the system is the same as the corresponding elements of the pitch portion of the system, the operation of which is described in detail above. Accordingly, the operation of the remainder of the yaw portion of the system will not be described in detail here.

It will be obvious on the basis of the above description that the yaw portion of the system has two operational phases; the first in which signals emanating from the synchro 53, the synchro 69, the servo rate generator 152, and the servo feedback synchro 155 are transmitted to the displacement potentiometer 25, the rate potentiometer 26, the servo rate potentiometer 28, and the feedback potentiometer 27, respectively, within the yaw section of the parameter control unit 20 in the manner shown in Fig. 2b wherein they are mixed, phased, and proportioned before they are transmitted to the servo amplifier 133, 134 and thence to the yaw control servo 150 shown best in Fig. 2b; and the second during coordinated turns in which the signal emanating from the synchro 69 is interrupted while the signal emanating from the synchro 53 is diverted to the synchronizing motor 57 and replaced by the signal generated by the roll pendulum 70 transmitted through the potentiometer 126 to the displacement potentiometer 25 in the parameter control unit.

MANEUVERING VIA THE AUTOMATIC PILOT

All maneuvering of the aircraft through the automatic pilot is done from the controller 110. Pitch and roll signals are introduced by manipulating the control stick 116 in pitch and/or roll which causes the rotors of the appropriate trim synchros to move relative to their stators and to produce an error signal which is fed through the system and ultimately causes the servos to rotate in a sense to reduce the error signals to null. Maneuvering signals for the yaw channel are produced by manipulation of the yaw trim signal control wheels 120 and again are effective to produce rotation of the servo-motor in a sense to nullify the error signal introduced.

Coordinated turns are also ordered from the controller 110. On coordinated turns the button 122 is depressed opening the switch contacts 123 and deenergizing the relays K127 and K128 to transfer control of the yaw channel from yaw rate and displacement to roll pendulum. Operation of the relays also introduces the yaw synchronizer into the circuit to keep the yaw displacement reference at null during pendulum control. In this way the yaw channel will be synchronized with the new heading produced by the turn.

Hovering is accomplished by manipulating the control stick 116 until the craft attains an attitude which will keep it fixed with respect to a point on the ground.

In the diagrams of Figures 1 and 2, signal flow is designated by arrows on the lines connecting the various components. For clarity, one arrow is used to indicate signal flow in the yaw channel, two arrows to show the path of the signal in the roll channel and three arrows to mark the pitch channel.

Although the invention has been generally discussed and illustrated as applied to a single main rotor helicopter with anti-torque tail rotor, it is equally applicable to other types of rotating wing aircraft including tandem rotor types.

Obviously many modifications and variations of the present invention are possible in the light of the above teachings. It is therefore to be understood that within the scope of the appended claims the invention may be practiced otherwise than as specifically described.

What is claimed is:

1. An automatic pilot for rotary wing aircraft having a fuselage suspended from at least one lifting rotor, said automatic pilot comprising gyroscope means for producing electrical signals corresponding to fuselage displacement in roll and pitch with respect to a predetermined reference attitude, directional gyroscope means for producing a selsyn signal corresponding to fuselage displacement in yaw with respect to said predetermined reference attitude, means for converting said selsyn signal to a synchro signal, further means for separately amplifying said pitch, roll and yaw displacement signals to control separate servo-mechanisms, and a manually operable controller means including a unitary element independently movable simultaneously about three mutually perpendicular axes, and means responsive to such movement of said unitary element about the respective axes to produce corresponding electrical signals, superimposed on the electrical signals produced by said gyroscope means, to maneuver the aircraft by means of the automatic pilot.

2. An automatic pilot for rotating wing aircraft having a fueslage pendulously suspended from at least one lifting rotor, said automatic pilot having pitch, roll and yaw channels including servo-mechanisms for applying control forces to the aircraft relative to the pitch, roll and yaw axes of the fuselage, null seeking and signal generating servo-mechanisms in each of said channels responsive to instantaneous displacement and to anticipated displacement of the aircraft fuselage about its pitch, roll and yaw axes relative to a predetermined reference attitude to generate signals proportional thereto, and said null-seeking servo-mechanisms being responsive to the instantaneous displacement and the rate of displacement of said pitch, roll and yaw servo-mechanisms relative to a predetermined reference position to generate signals proportional thereto, and means having pitch, roll and yaw circuits in each of which the various generated signals definitive of motion about pitch, roll and yaw axes, respectively, are algebraically summed to produce a single resultant signal in each circuit operable to produce compensating movement of the corresponding servo-mechanism, said resultant signals together being collectively effective to control the attitude of an aircraft under all flight conditions.

3. A device as described in claim 2, and, in addition, a maneuvering controller incorporated in the automatic pilot and including a manually operable control element movably mounted for simultaneous adjustment independently about two perpendicular axes, and means connected to the control element operable in response to movements of the control element about the respective axes to induce corresponding changes in the reference attitude for the fuselage and thereby modify the flight path followed by the aircraft under the control of the automatic pilot.

4. A device as described in claim 3, and, in addition, a position sensing means rotatably mounted for movement about the roll axis of the fuselage operable to detect deviations of the fuselage from an apparent vertical position, means responsive to said position sensing means and operable to produce compensating movements of the yaw channel servo-mechanisms for applying control forces to the aircraft relative to the yaw axis of the fuselage, and selectively operable switch means mounted upon said control element and simultaneously effective to connect said means responsive to said position sensing means to the servo-mechanism of the yaw channel and to disconnect the means responsive to displacement of the fuselage about its yaw axis from the yaw channel servo-mechanism during coordinated turns.

5. An automatic pilot for rotating wing aircraft having a fuselage suspended from at least one lifting rotor, said automatic pilot comprising a plurality of servo-mechanisms for controlling the flight of the aircraft, a first plurality of sensor means arranged to detect displacement of the aircraft fuselage relative to a predetermined reference attitude therefor, a first plurality of signal generating means connected to the first plurality of sensor means to generate single phase A.C. fuselage displacement signals which are functions of the displacements detected by the respective sensor means, a second plurality of sensor means arranged to detect rate of displacement of the aircraft fuselage relative to the predetermined reference attitude therefor, a second plurality of signal generating means connected to the second plurality of sensor means to generate single phase A.C. fuselage rate signals which are functions of the rates of displacement detected by the respective sensor means, a first plurality of adjustable phase shifting means operable to introduce predetermined phase lead to the fuselage rate signals so that said fuselage rate signals anticipate the maximum displacements of the fuselage, a third plurality of signal generating means connected to the servo mechanisms to generate single phase A.C. servo displacement signals which are functions of the corrective displacements of the respective servo-mechanisms, a second plurality of adjustable phase shifting means operable to introduce predetermined phase lead to the servo displacement signals so that said servo displacement signals predict the control effect upon the fuselage of the respective servo-mechanisms, a fourth plurality of signal generating means connected to the servo-mechanisms to generate single phase A.C. servo rate signals which are functions of the rates of corrective displacement of the respective servo-mechanisms, and a control unit arranged to receive, mix, phase, and modify the respective fuselage displacement signals, modified fuselage rate signals, modified servo displacement signals, and servo rate signals and produce therefrom a resultant single phase A.C. signal for transmission to the respective servo-mechanisms.

6. An automatic pilot for rotating wing aircraft having a fuselage pendulously suspended from at least one lifting rotor, said automatic pilot comprising pitch, roll, and yaw servo mechanisms for applying control forces to the aircraft relative to the pitch, roll, and yaw axes of the fuselage; pitch, roll, and yaw fuselage displacement sensor means arranged to detect displacement of the aircraft fuselage about its pitch, roll, and yaw axes relative to a predetermined reference attitude therefor; a first set of signal generating means connected to the pitch, roll, and yaw fuselage displacement sensor means to generate single phase A.C. fuselage displacement signals which are functions of the displacements detected by the respective fuselage displacement sensor means; pitch, roll and yaw fuselage rate sensor means arranged to detect rate of displacement of the aircraft fuselage about its pitch, roll, and yaw axes; a second set of signal generating means connected to the pitch, roll, and yaw fuselage rate sensor means to generate single phase A.C. fuselage rate signals which are functions of the rates of displacement detected by the respective fuselage rate sensor means; a first set of adjustable phase shifting means operable to introduce predetermined phase lead to the respective fuselage rate signals so that said fuselage rate signals anticipate the maximum displacements of the fuselage; a third set of signal generating means connected to the pitch, roll, and yaw servo-mechanisms to generate single phase A.C. servo-displacement signals which are functions of the corrective displacement of the respective servo-mechanisms; a second set of adjustable phase shifting means operable to introduce predetermined phase lead to the respective servo displacement signals so that said servo displacement signals predict the control effect upon the fuselage of the respective servo-mechanisms; a fourth set of signal generating means also connected to the pitch, roll, and yaw servo-mechanisms to generate single phase A.C. servo rate signals which are functions of the rates of corrective displacement of the respective servo-mechanisms; and a control unit having pitch, roll, and yaw sections arranged to receive, mix, phase, and modify the respective fuselage displacement signals, modified fuselage rate signals, modified servo displacement signals, and servo rate signals and produce therefrom resultant single phase A.C. pitch, roll, and yaw signals for transmission to the pitch, roll, and yaw servo-mechanisms.

7. A device as described in claim 6, and, in addition, a maneuvering controller interposed between the pitch, roll, and yaw displacement sensor means and the control unit, said maneuvering controller including a manually operable control element mounted upon first and second gimbal members for simultaneous movement about two perpendicular axes, a detent arranged to releasably restrain said control element in a centered position corresponding to the reference attitude of the fuselage, and means mounted upon the respective gimbal members and connected to the control element operable in response to movements of the control element about the respective axes to modify the pitch and roll fuselage displacement signals and thereby induce corresponding changes in the reference attitude of the fuselage to modify the flight path followed by the aircraft under the control of the automatic pilot.

8. A device as described in claim 7, and, in addition, a coordinated turn yaw control means including a position sensing and signal generating means rotatably mounted for movement about the roll axis of the fuselage operable to detect deviations of the fuselage from an apparent vertical position and to generate a signal which is a function of the magnitude and sense of such deviations, a selectively operable normally closed switch means mounted upon said control element and effective when opened during coordinated turns to connect said position sensing and signal generating means with the portion of said control unit which normally receives the yaw fuselage displacement signal and simultaneously to disconnect the signal generating means connected to the yaw fuselage displacement sensor means from the control unit, whereby the signal generated by said position sensing and signal generating means is substituted for the signal which is a function of the fuselage displacement about the yaw axis, and synchronizing means arranged to receive the yaw fuselage displacement signal when said switch means is open and operable in response thereto to maintain the signal generating means connected to the yaw fuselage displacement sensor means at a null position during a coordinated turn.

9. A device as described in claim 6, in which each section of said control unit includes four variable potentiometers, each adjustable over a wide range to compensate for a parameter representative of the inherent characteristics of the aircraft in which said autopilot is installed, said potentiometers being arranged to receive the respective fuselage and servo displacement and rate signals as inputs to the control units, a plurality of phasing capacitors operatively connected to said potentiometers, and four mixing transformers the input sides of which are connected across the respective potentiometers and the output sides of which are connected to an electrically common point to produce an output signal of substantially constant impedance notwithstanding the wide range of adjustment of the respective potentiometers.

10. A device as described in claim 6, in which each adjustable phase shifting means comprises a synchro-transformer having a stator arranged to receive a three phase signal input and a rotor which generates a single phase A.C. signal that is a function of rotor displacement relative to the stator, an amplifier, means for transmitting the rotor signal both to the control unit and to said amplifier, a servo-motor operable in response to a signal transmitted by said amplifier, a variable speed drive unit connected to the rotor of said synchro-transformer, and a suitable gear train interconnecting said servo-motor and said variable speed drive unit, whereby the desired modification of a signal emanating from said synchro-transformer may be obtained by proper adjustment of said variable speed drive unit, said variable speed drive unit being adjustable in accordance with an external aerodynamic parameter definitive of rate.

11. An automatic pilot for rotary wind aircraft having a fuselage pendulously supported by at least one lifting rotor, said automatic pilot comprising yaw, pitch and roll channels, each of said channels including a plurality of separate signal generating and null-seeking servo-mechanisms for providing separate signals indicating fuselage angular displacement relative to a predetermined fuselage reference attitude, rate of fuselage angular displacement, predicted fuselage position due to application of automatic pilot control, and rate of application of automatic pilot control, respectively, a control unit provided with means for modifying each of the respective signals provided in each channel in accordance with parameters representative of characteristics of the aircraft, said signal modifying means including means for mixing, phasing and proportioning said signals and computing therefrom for each of said yaw, pitch and roll channels a single resultant error signal determinative of the magnitude and sense of the corrective control to be applied to the aircraft about each of the yaw, pitch and roll axes, and means in each of the yaw, pitch and roll channels responsive to the respective resultant error signals to maintain an aircraft in the desired attitude.

12. In an automatic pilot for rotary wing aircraft having a fuselage suspended from at least one lifting rotor a maneuvering controller for maneuvering rotary wing aircraft through the automatic pilot, said controller comprising a roll controller synchro and a pitch controller synchro, a manually operable control stick movably mounted within the fuselage of an aircraft connected to the rotors of said synchros so that movement of the control stick about an axis parallel to the roll axis of the aircraft will produce a signal that will cause a corresponding control force to be applied about the roll axis of the aircraft fuselage via the automatic pilot and movement of the control stick about an axis parallel to the pitch axis of the aircraft will cause the application of a corresponding control force about the pitch axis of the aircraft fuselage, a yaw controller and trim synchro mounted on the control stick concentrically therewith, manual yaw control means mounted upon said control stick and connected to said yaw controller and trim synchro operable to produce a signal which will cause the application of corresponding control forces about the yaw axis of the aircraft fuselage, individual trim control means for said pitch and roll controller synchros including manually operable control means therefor to permit compensation for steady state trim changes in pitch and roll without manipulating said control stick, and a coordinated turn switch mounted on said control stick, said turn switch being effective when operated to shift control of the yaw axis of the automatic pilot from a gyroscope to a roll pendulum.

13. An automatic pilot for rotating wing aircraft having a fuselage pendulously supported from at least one lifting rotor, said automatic pilot having pitch, roll and yaw channels comprising servo-mechanisms for applying control forces to the aircraft in pitch, roll and yaw according to an error signal, each of said channels including a plurality of signal generating and null-seeking servo-mechanisms for producing electrical signals in each of the pitch, roll and yaw channels representing fuselage displacement from a predetermined reference attitude, rate of fuselage displacement, servo displacement and rate of servo displacement, respectively, and a parameter control composed of a pitch channel parameter control, a roll channel parameter control and a yaw channel parameter control, each of said channel parameter controls including a fuselage displacement signal circuit, a fuselage rate signal circuit, a servo displacement signal circuit and a servo rate signal circuit, each of said signal circuits including a potentiometer and an adjustable phasing capacitor operatively connected to a mixing transformer to provide means for modifying the electrical signals imposed upon the respective signal circuits by the respective signal generating servo-mechanisms in each channel, in accordance with parameters representative of inherent characteristics of the aircraft, the respective signal circuits within each of said channel parameter controls terminating at an electrically common point at which a single significant instantaneous error signal for each channel is produced which is the resultant of the plurality of electrical signals produced by the respective signal generating servo-mechanisms for each channel.

References Cited in the file of this patent

UNITED STATES PATENTS

| | | |
|---|---|---|
| 2,443,192 | Moeller | June 15, 1948 |
| 2,450,084 | Emerson | Sept. 28, 1948 |
| 2,471,821 | Kutzler et al. | May 31, 1949 |
| 2,479,549 | Ayres et al. | Aug. 23, 1949 |
| 2,570,905 | Young et al. | Oct. 9, 1951 |
| 2,619,623 | Meredith | Nov. 25, 1952 |
| 2,623,714 | Slater | Dec. 30, 1952 |
| 2,630,282 | Halpert | Mar. 3, 1953 |
| 2,632,142 | Chenery | Mar. 17, 1953 |
| 2,638,288 | Hanna | May 12, 1953 |
| 2,664,530 | Young | Dec. 29, 1953 |
| 2,733,878 | Ciscel | Feb. 7, 1956 |

OTHER REFERENCES

Meyers, Vanderlip and Halpert: "A Tested Solution of the Problem of Helicopter Stability and Automatic Control," Aeronautical Engineering Review, vol. 10, No. 7, July 1951. Pp. 27–32.